Jan. 12, 1965   D. J. GEIER ETAL   3,165,356
SHOCK ABSORBING SUPPORT AND RESTRAINT MEANS
Filed Dec. 17, 1963   3 Sheets-Sheet 1

INVENTORS
Douglas J. Geier
Richard S. Johnston
Gerard J. Pesman
Matthew I. Radnofsky
BY
ATTORNEYS Jan. 12, 1965   D. J. GEIER ETAL   3,165,356
SHOCK ABSORBING SUPPORT AND RESTRAINT MEANS
Filed Dec. 17, 1963   3 Sheets-Sheet 2

INVENTORS
Douglas J. Geier
Richard S. Johnston
Gerard J. Pesman
Matthew I. Radnofsky
BY
ATTORNEYS Jan. 12, 1965  D. J. GEIER ETAL  3,165,356
SHOCK ABSORBING SUPPORT AND RESTRAINT MEANS
Filed Dec. 17, 1963  3 Sheets-Sheet 3

INVENTORS
Douglas J. Geier
Richard S. Johnston
Gerard J. Pesman
Matthew I. Radnofsky
BY
ATTORNEYS

3,165,356
SHOCK ABSORBING SUPPORT AND RESTRAINT MEANS
Douglas J. Geier, Houston, Gerard J. Pesman, Friendswood, and Richard S. Johnston and Matthew I. Radnofsky, Seabrook, Tex., assignors to the United States of America as represented by the Administrator of the National Aeronautics and Space Administration
Filed Dec. 17, 1963, Ser. No. 331,324
8 Claims. (Cl. 297—216)
(Granted under Title 35, U.S. Code (1952), sec. 266)

The invention described herein may be manufactured and used by and for the Government of the United States of America for governmental purposes without the payment of any royalties thereon or therefor.

This invention relates to a shock absorbing support means, and more particularly to a couch for supporting a living occupant when subjected to large acceleration or deceleration forces.

During the launch phase of a space vehicle's departure from the earth and the re-entry of the vehicle into the atmosphere, the space traveler's body is subjected to extreme accelerating or decelerating forces. In instances where a spacecraft is brought down in a "hard" landing, such as might occur when a spacecraft is brought down on a ground surface by means of parachutes, deceleration at the time of impact may subject the body to as much as seventy-five (75) "G's," or more, of force which is far in excess of human tolerance to "G" forces. Unless such large forces are absorbed over a large area of the body, serious or fatal injury to the space traveler will result. The problem of protecting the human body against large "G" forces is not unique to space flight, however, since the ever-increasing speed of modern transportation presents increasing demands for new ways to protect travelers against the hazards of extreme accelerations or sudden decelerations.

Many devices, of course, have heretofore been developed and used for protecting the human body against large forces of acceleration or decleration. For aircraft passengers, for example, various seating arrangements such as padded or cushioned chairs, bucket type seats, and the like, have been devised. In other instances rigid supporting frames covered by a resilient netting of webs or straps, or various combinations thereof, have been used. In these devices, the webs and straps are customarily made from fabric such as nylon, dacron, rayon, and the like, and combinations thereof. While generally all of these prior art seating arrangements provide posterior support and some degree of comfort, they provide little or no lateral support for the occupant. Consequently, the passengers are liable to injury during maneuverings at high speed or by oscillations and buffeting at high "G" forces as would be particularly true in the flight of spacecraft wherein the occupant is subjected to omnidirectional forces of far greater magnitude. One type of aircraft seat hitherto devised, and which is disclosed in U.S. Patent No. 2,637,368, comprises a seat suspended by shock absorber straps of undrawn synthetic fibers which are adapted to absorb energy without recoil or rebound. This type of seat, however, like other prior art devices, does not provide support over a large area of the body as would effect a distribution of the absorption of energy sufficient to avoid injury in the event of the application of high "G" forces.

A couch disclosed in U.S. Patent No. 3,038,175 and which has been used in early space flights for protecting an astronaut against high "G" forces comprises a sheet of rigid material of Fiberglas, or the like, with recesses formed therein specifically conforming to the lateral and posterior contour of the individual astronaut and with a layer of honeycombed shock absorbing material applied to the back of the rigid contoured sheet. This type couch is heavier than is desired, however, weighing approximately forty-two (42) pounds or more and has the inherent disadvantage of requiring individual design and fabrication for the particular person who is to use it. Its capacities for shock absorption and attenuation are also inconstant.

The support means of this invention, which has been devised to overcome the attendant disadvantages of the prior art devices, comprises a net or webbing which is attached about its periphery to a rigid framework and adapted to support a fragile form such as the human body. The webbing is made from partially drawn synthetic strands which are normally non-elastic, so that when a load in excess of a predetermined amount is applied to the webbing, the strands are adapted to permanently elongate in accordance with the degree of load applied and in so doing absorb energy without significant recoil or rebound. Various sectional areas of the webbing are fabricated with different yield strengths in correspondence with the relative mass of the body member resting on the particular section. As used throughout this specification, the term "yield strength" is used to indicate the greatest tension stress the fabric can bear without undergoing permanent elongation and deformation. Consequently, when excessive loads are imposed on the webbing, as by an astronaut's body during the launch and re-entry phases in the flight of a space vehicle and at the time of landing impact, some sections will give less than others, whereby the attitude and contour of the pilot's body will be maintained and the body supported in a manner to avoid injury.

The novel body support means also includes means for restraining the body from lateral movement on the support and are in the form of leg and torso restraints when the invention is used as an astronaut's couch. These lateral movement restraints are fabricated of the same material as the webbing to which they are attached and are adapted to be strapped about the body when supported on the webbing. The restraints function in the same manner as the body support webbing and thereby provide shock-absorbing support for the body when excessive longitudinal or sidewise forces are exerted thereon.

Other objects and many of the attendant advantages of this invention will be readily appreciated as the same become better understood by reference to the following detailed description when considered in connection with the accompanying drawings in which like reference numerals designate like parts throughout the figures thereof and wherein.

Figure 1:
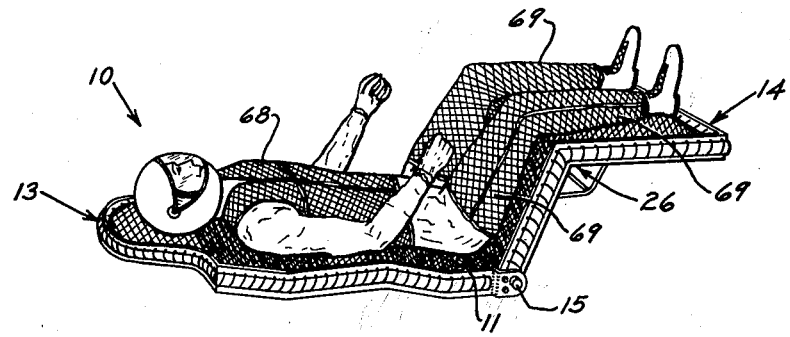
FIG. 1 is a perspective view of the novel body support means of this invention when used as a couch for a human occupant.

Referring more particularly to the drawings, a body support means 10 which represents a preferred embodiment of this invention, is shown in FIG. 1 as it is used in the manner of a couch for supporting a person in a reclining position thereon. The body support means 10 comprises a webbing 11 of cross-woven flexible cords attached about its periphery to a rigid framework in a manner whereby the webbing is held by the frame in a taut spread condition. The framework is desirably fabricated of lightweight metal such as aluminum, stainless steel, or the like, and is comprised of two sections 13 and 14 which are joined by pivotal connections 15 and together describe a closed loop similar to the frame of a cot or stretcher. With the webbing attached to the frame, the section 13 is adapted to support the head and torso of a person reclining thereon, with the section 14 providing support for the legs of the individual. The framework and webbing are of a configuration and area which are adequate to provide full support for a human form when reclining thereon.

The two-part construction of the frame permits for adjustment of the two sections and therefore the angle at which a person's legs are supported relative to the torso. Although a particular angular relationship of the two sections is desired for periods when the application of high "G" forces is expected, the adjustable connected permits the person on the couch to adjust to different or more restful positions at other times. It is to be understood, however, that the frame might also be a unitary non-adjustable structure if such is desirable.

Figure 4:
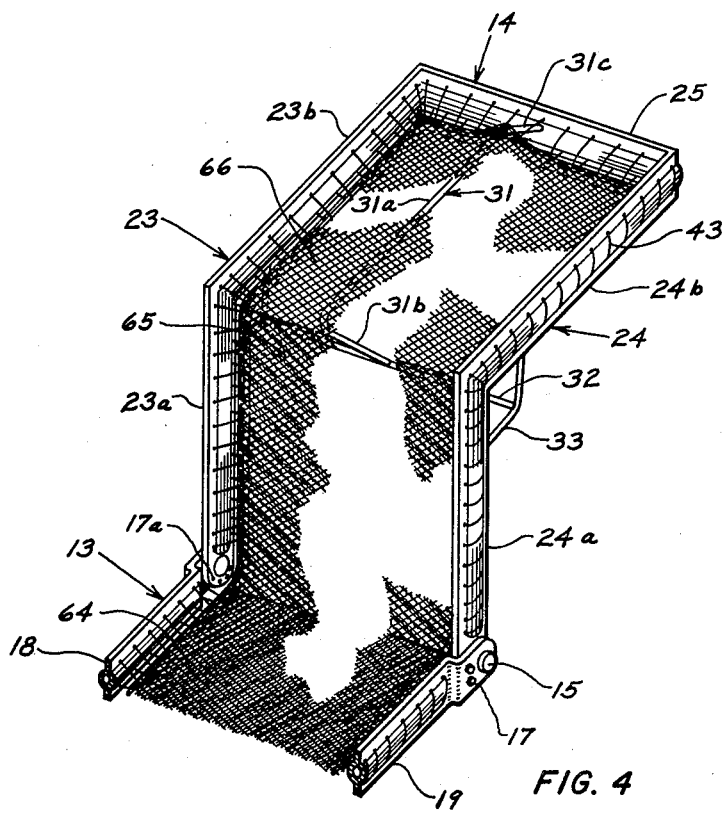
FIG. 4 is a perspective view of the body support means of FIG. 1, with parts broken away to show structural details of the end of the support means used for supporting the legs of a person when reclining thereon.

The pivotal connections 15 for the frame sections 13 and 14 are provided with lock means 17 whereby the sections may be angularly adjusted and set in a predetermined angular configuration for supporting a human form in a desired posture. As shown in FIG. 4, the sections 13 and 14 are locked in a desired angle by bolts 17 inserted through aligned holes provided in the two sections for this purpose. To permit for selective adjustment, a plurality of holes 17a are provided in the section 14. Various other locking devices, of course, which when unlocked would permit angular adjustment of the two sections, might be suitably employed.

Figure 2:
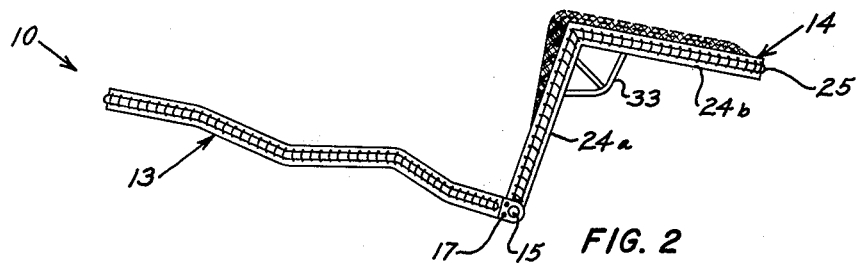
FIG. 2 is a side view of the rigid framework to which the webbing in the body support means of FIG. 1 is peripherally attached.
Figure 3:
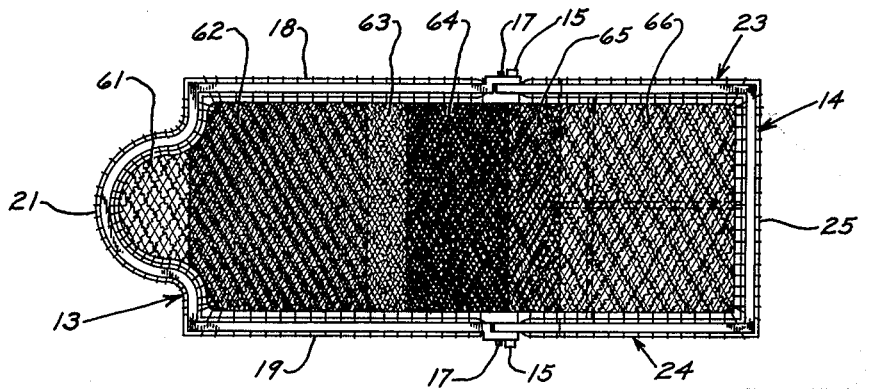
FIG. 3 is a plan view of the body support means of FIG. 1 with sections of the webbing characterized by different yield strengths shown schematically.

The section 13 of the frame which supports the torso of a person when reclining on the body support means 10 is substantially of U-shape, as shown in FIG. 3, with parallel elongate members 18 and 19 which form the sides of the frame representing the legs of the U, and the transverse end member 21 representing the base of the U. The end member 21 is provided with a central projecting arcuate portion for accommodating the head of a person reclining on the support, although it may be made of straight construction if the sides 18 and 19 are made sufficiently long to accommodate the head and torso. As shown in FIG. 2, the U-shaped section 13 is formed with a curvature in profile which corresponds to the lateral contour of the posterior of a person's upper body. By this feature the section is adapted to provide continuous support for the body throughout its length from head to hips.

The leg-supporting section 14 of the couch comprises straight side members 23 and 24 disposed in parallel planes and integrally joined by a straight member 25 which constitutes the foot end of the couch. The sides 23 and 24 are each formed with a sharp angular bend or knee substantially at their mid-points whereby each member is divided into a portion (23a, 24a) which adjoins the end member 25 and a portion (23b, 24b) which is hinged to the frame section 13. The respective side portions 23a and 24a which adjoin the end member 25 are equal in length and lie co-planar in a plane which forms an angle of slightly more than ninety degrees with the plane defined by the side portions 23b and 24b which are likewise of equal length.

As best shown in FIG. 4, the frame section 14 is provided with a central divider bar 31 which extends along the central longitudinal line of the support means 10 and divides the section 14 into two separate leg supporting sections. The divider bar, at one end, is attached to the end member 25 at the mid-point thereof, and at its other end to the mid-point of a brace bar 32 which extends transversely of the frame section 14. The ends of the transverse brace 32 are secured to angular braces 33 which are located respectively in the bends of the knees formed in the frame side members 23 and 24. The divider bar is comprised, for the greater portion of its length, of a straight elongate section 31a with angularly depending end portions 31b and 31c which join at their ends with the brace 32 and the end member 25, respectively. As best shown in FIG. 2, the divider bar extends from the frame end member 25 in parallel relation to the central longitudinal line of the couch to a point beyond the knee of section 14 and in a raised position relative to the plane defined by the sections 23b and 24b of the frame side members. As attached to the frame, the webbing is placed over the divider bar whereby it is slightly uplifted relative to the sides of the frame.

The webbing, which is the only part of the body support means in direct contact with the body to be supported, is made from cross-woven partially drawn nylon strands and along its peripheral margins is folded over and stitched with a double seam to form a casing 41 which extends about the periphery of the webbing. The casing is provided for accommodating a cable 42 of twisted strands of steel wire which is threaded through the casing and joined at its ends, as by swaging, to form a closed loop. The loop of cable thus disposed along the periphery of the webbing is engaged by a lacing cord 43 which is threaded through longitudinally spaced holes 44 in the frame members and wrapped about the cable to secure the webbing to the frame. Provision of the cable permits a continuous attachment of the webbing to the frame and continuous support of the webbing along its periphery.

Figure 5:
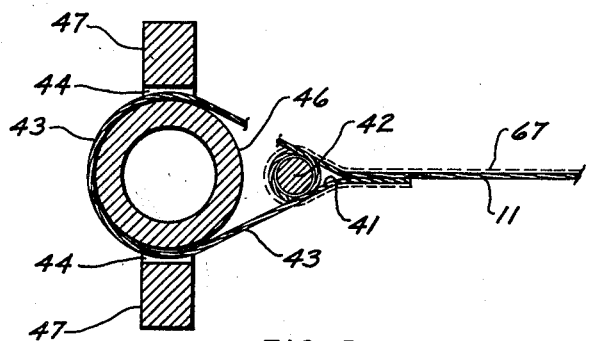
FIG. 5 is a partial cross-sectional view through one member of the rigid framework of the body support means of FIG. 1 showing one manner of attachment of the webbing to the frame.

As shown in FIG. 5, the frame members are each in the form of a tube 46 with diametrically opposed longitudinal flanges 47, although it is to be understood, of course, that while a particular cross-sectional form of frame member is shown, a variety of forms might be used. In each member one row of the longitudinally spaced holes is formed directly above the tube and a second row of holes just below the tube so that the rows are continuous about the length of the assembled frame. The holes or perforations are formed in the frame members in a manner so as to expose the surface of the tube which forms one wall of each perforation. The lacing cord, which is wrapped about the tube and cable and which holds the cable closely adjacent the frame, is alternately threaded through an upper hole and then a lower hole. Because of the smooth surface of the tube, the lacing cord does not engage any sharp edges and is therefore not likely to become frayed or severed. For safety considerations, the lacing cord is tied off at spaced intervals along the frame or it may be comprised of many separate sections of relatively short length.

The partially drawn strands of nylon which comprise the webbing are normally non-elastic and demonstrate hysteresis, in that they become permanently elongated when tension stresses in excess of a predetermined amount are applied thereto. Since undrawn nylon has the capability of elongating up to approximately 600% without becoming resilient which, however, would generally be excessive for most applications, partially drawn nylon and other synthetic fibers which are capable of elongating by approximately 280% without becoming resilient are preferred. As a substitute for nylon, synthetic fibers such as Polyethylene, Vinyon, and Vinylite could also be used.

The webbng 11 is fabricated with different transverse sectional areas each having a yield strength which is uniform throughout the particular sectional area and of a magnitude in predetermined correspondence with the mass of the body member resting on the particular section. The yield strengths for the various sections are so selected that when excessive loads beyond a predetermined amount are imposed on the webbing, as might occur during launch and re-entry of a space vehicle or at the time of landing impact, some sections will give less than others, whereby the attitude and contour of the pilot's body will be maintained and the body supported in a manner to avoid injury. The sections are attached to the frame to extend transversely thereof rather than longitudinally, since a longitudinal attachment would not maintain the body contour. Since human tolerance to "G" forces is little more than twenty (20) "G's," the yield strengths in any particular couch are necessarily limited to permit permanent elongation of the webbing with absorption of energy before the applied "G" forces reach the tolerance limit but could, of course, be any value below this limit. Attenuation by elongation of the fabric prevents the "G" forces from exceeding the tolerance limit. In one model of the body support means which has been fabricated for use as an astronaut's couch, the section 61 of the webbing for supporting the head of the astronaut, as shown in FIG. 3, is fabricated with a yield strength of approximately twenty (20) pounds per linear inch, whereas the next adjacent section 62 for supporting the upper torso and shoulders is fabricated with a yield strength of approximately thirty-seven (37) pounds per linear inch. The section 63 for supporting the torso in the area at the small of the back is provided with a yield strength of approximately twenty-seven (27) pounds per linear inch and the section 64 for supporting the hips and lower torso is the strongest of the sections, having a yield strength of approximately forty-two (42) pounds per linear inch. The sections 65 and 66 for supporting the thighs and lower legs, respectively, are fabricated with yield strengths of approximately thirty-seven (37) pounds per linear inch and twenty-seven (27) pounds per linear inch, respectively.

The model couch was designed to support an individual with a height of six feet two inches, weight of one hundred eighty-five (185) pounds. Drop tests and tests made with use of a centrifuge showed that a webbing with yield strengths as indicated is adequate to provide support for individuals within the height range of five feet seven inches to six feet four inches, and within the weight range of one hundred fifty (150) to two hundred forty (240) pounds and is adapted to elongate and effectively absorb energy under the application of a force which without attenuation would approximate seventy-five (75) "G's." Different body weights caused different lengths of the attentuation stroke of the webbing which, of course, is directly related to the elongation of the non-resilient cords. After being subjected to a load sufficient to exceed the yield strengths of the webbing sections and cause deformation of the cords, the webbing is indented with a recess conforming to the posterior contour of the particular body which has been supported. The deformation is permanent so that re-use possibilities for the webbing are limited and dependent upon the degree of non-resilient stretch remaining in the synthetic cords. Little or no permanent deformation is normally expected during launch or re-entry of a space vehicle and therefore the non-resilient stretch capability would remain large.

The body support means of this invention could be used to support a variety of objects which need to be protected against large accelerative or decelerative forces, as for example, many forms of logistic supplies which are dropped by parachute to troops and which are susceptible to damage upon impact. The number of webbing sections with different yield strengths should be sufficient to preserve the body contour of such objects during the attenuation of high "G" forces at time of impact.

It is also contemplated that the webbing in the body support means 10 may be combined with a layer of breakaway fabric 67 such as canvas or the like, which, when attached about its periphery to the frame as shown by dashed lines in FIG. 5., would absorb a percentage of the shock energy before the webbing is tested. A combination of this type might be used to reduce the length of the attenuation stroke, i.e., the distance which the body drops below the frame whenever this distance must necessarily be limited because of space limitations below the frame.

As an alternative to a layer of break-away fabric or in addition thereto, each cord of the non-resilient webbing may also be fabricated to include a strand of fully drawn Dacron, nylon, or the like, whereby these strands would serve in identical manner as the break-away fabric to absorb a share of the shock energy and reduce the attenuation stroke.

For the purpose of restraining a body from lateral movement on the body support means 10, it is also provided with lateral restraint means comprising an upper torso restraint 68 in the form of a vest and a pair of leg restraints 69 when the invention is used as an astronaut's couch as shown in FIG. 1. These lateral movement restraints are fabricated of the same material as the webbing and are each comprised of two parts which are sewn along one edge to the webbing and provided with a zipper whereby they are adapted to be strapped about the body and zippered together as shown. The restraints function in the same manner as the body support webbing 11 and provide shock absorbing support for the body when longitudinal or sidewise forces are exerted thereon. For each restraint, the yield strength is selected in accordance with the mass of the body member which it is to restrain.

There are many variables by which the yield strength for a particular section of webbing may be determined. The yield strength is primarily determined by, and directly dependent upon, the number of cords per unit area in the fabric and the denier of the individual cords. The number of cords per unit area may be controlled by the number of courses and wales which are formed in the fabric during the knitting thereof and the number may be varied by changing the size of the knitting needles, or by knitting the fabric under selected degrees of tension. Furthermore, the denier of each particular cord is dependent upon the number of braided yarns which comprise the cord and also upon the denier of the continuous filaments which comprise each yarn and the number of these filaments. For each filament the denier is directly proportional to its diameter which is, of course, determined by the size of hole through which the filament is drawn during its formation. Cords of undrawn and partially drawn nylon are commercially available which are made from a number of braided yarns within the range from four (4) to eight (8) and the number of continuous filaments in commercially available yarn is generally within the range of thirty (30) to thirty-four (34). Consequently, there are many variables available to the manufacturer in making a fabric with a particular denier and yield strength.

Figure 6:
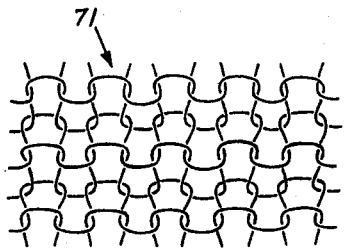
FIGS. 6 and 7 illustrate two types of weave which are employable in fabricating the webbing of the body support means in FIG. 1.
Figure 7:
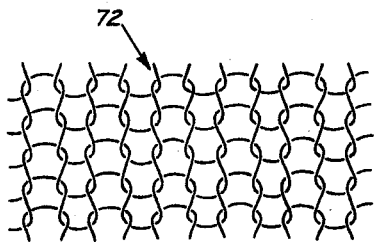
Figure 8:
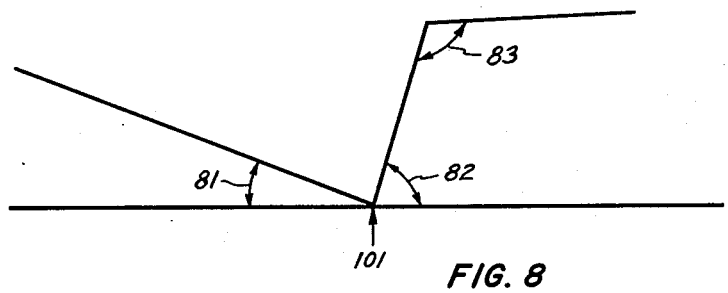
FIG. 8 is a schematic diagram illustrating the preferred angular configuration of the body support means of FIG. 1 when used as a couch for supporting a human occupant.

In FIGS. 6 and 7 there are illustrated two types of weave or stitch patterns 71, 72 which may be employed in fabrication of the webbing 11. The pattern illustrated in FIG. 6 is the conventional "one right, one left" stitch, and the pattern illustrated in FIG. 7 is a conventional "straight plain stitch." The differences in the two patterns become evident in comparing the left edges of the patterns as shown in the figures. In the pattern in FIG. 7 all of the cords at the left edge go under the loop of the cord directly above, whereas in the pattern of FIG. 6 there is alternation in the manner in which the cords are secured to the loops of adjacent cords. The two patterns may be used for adjacent sections of the webbing to more conspicuously distinguish the sections of differing yield strengths, although the same pattern could be used throughout the webbing with different sections joined by interknitting along adjacent edges. The spacing between the courses and the spacing between the wales in each pattern, and therefore the number of cords per unit area, may be adjusted by weaving the cords under different degrees of tension or by using different size needles. There is, of course, some initial stretch of the fabric due to tightening of the weave whenever a load is applied, and to minimize this initial stretch the fabric is spread taut as it is attached to the frame.

FIG. 7 of the drawings illustrates the preferred angles for the couch at which different anatomical regions of the human body are supported when major "G" forces are applied in the direction indicated by the arrow 101. The use of the preferred angles insures maintenance of adequate blood supply in the heart region and brain to prevent the occupant from "blacking out" during critical "G" periods of space travel, and in addition is generally the most comfortable configuration. As shown in FIG. 7, the preferred angle 81 at which the back is supported relative to the horizontal by the frame section 13 is in the range of zero degrees to twenty (20) degrees. The lower body regions are desirably supported by the frame section 14 so that the thighs are elevated from the horizontal at an angle 82 slightly less than ninety (90) degrees. The lower leg appendages and feet of the occupant are supported relative to the thighs by an angle 83 corresponding to the bend of the knee which is slightly in excess of ninety (90) degrees.

If desired, of course, pivotal connections, similar to the pivotal connections 15, might also be provided at the knee of the leg-supporting section 14 to permit variation in the angle at which the lower legs are supported relative to the thighs.

Figure 9:
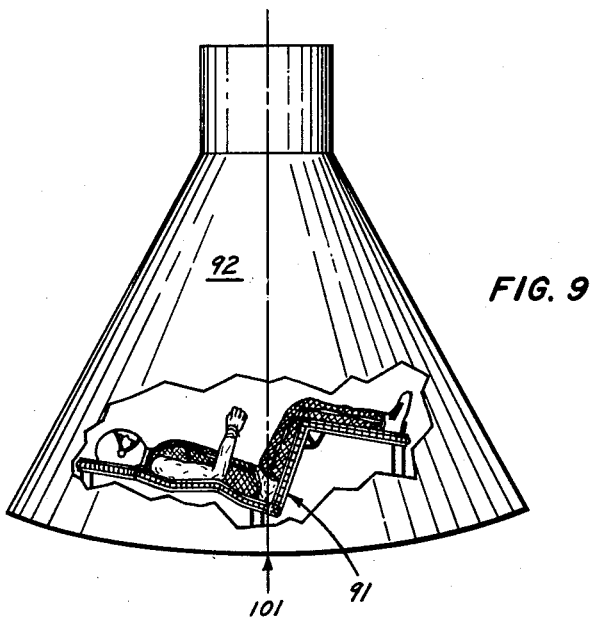
FIG. 9 illustrates an application wherein a support means in accordance with this invention and having the angular configuration of FIG. 8 is positioned for use as a survival couch within a space vehicle.

FIG. 9 illustrates one application of the body support means of this invention as an astronaut's couch 91 in a space capsule 92 wherein the high "G" forces sustained by the occupant will be in the direction indicated by the arrow 101. The "G" forces to be sustained by the occupant result from the forces of acceleration and deceleration which occur during the launching of the space vehicle from the earth, its reentry from outer space into the earth's atmosphere, and also its impact upon landing on the earth's surface.

It will therefore be seen that a new and improved body support means is described herein which is adapted to absorb shock loads without recoil or rebound. Large forces of acceleration or deceleration to which the supported body may be subjected are adapted to be absorbed over a large area of the body and in a manner to avoid injury. While the particular application described is in the form of an astronaut's couch, the body support means may be used to support any object or body which is to be subjected to perpendicular, lateral, or horizontal forces, and might readily be made in configurations other than that of a couch, depending on the purposes for which it is to be used and the nature of the objects it is to support.

It should be understood, of course, that the foregoing diclosure relates only to preferred embodiments of the invention and that it is intended to cover all changes and modifications of the examples in the invention herein chosen for the purposes of the disclosure which do not constitute departure from the spirit and scope of the invention.

What is claimed and desired to be secured by Letters Patent is:

1. A shock-absorbing support means adapted to be used as a couch, said support means comprising:

a rigid frame encompassing an occupant-receiving space, said frame having a curvature in profile which substantially corresponds to the posterior contour of the human body and being comprised of first and second sections which are pivotally connected to one another;

a fabric webbing including a first layer comprised of a plurality of sections of normally non-elastic material which is permanently elongatable beyond its normal length when subjected to tension forces in excess of the yield strength of the material, said webbing including a second layer of fabric having a uniform tensile strength which is less than that of the yield strength of any of said sections;

means for securing the peripheral margins of the webbing to the frame whereby each of said webbing sections is attached to spaced points of the frame, said webbing and said first frame section being adapted to support the torso and head of a person reclining on said support means and said webbing and second frame section being adapted to support the legs of the person; and means for locking said frame sections in a selected angular relationship for supporting a person in a desired position, said webbing sections each possessing a yield strength in the predetermined relationship to the mass of the part of the body of a person resting thereon whereby when "G" forces in excess of the yield strength of any of said webbing sections are applied upon a person reclining on the couch the first layer of webbing will absorb a component of the forces before breaking and the second layer of webbing will stretch without resiliency to absorb the remainder components of said forces and maintain the attitude and contour of the person's body during the application and attenuation of said forces.

2. A shock absorbing body support means adapted to be used as a couch comprising:

a frame of rigid spaced members encompassing an occupant-receiving space, said frame having a curvature in profile which substantially corresponds to the posterior curvature of a person's body and being comprised of first and second sections which are pivotally connected;

a fabric webbing comprised of a plurality of sections of normally non-elastic material;

means for securing the peripheral margins of the webbing to the frame whereby each of said webbing sections is attached to spaced members of said frame and the webbing and said first frame section are adapted to support the torso and head of a person reclining on said support means and the webbing and said second frame section are adapted to support the legs of said person, each said webbing section possessing a yield strength in predetermined relationship to the mass of a part of a person's body normally resting thereon when the person is reclining on said couch and being permanently elongatable beyond its normal length when subjected to a load in excess of its yield strength;

a plurality of restraint means for restraining the body of a person supported on the webbing from relative movement thereon, each said restraining means being fabricated of non-elastic material having a yield strength in predetermined relationship to the mass of the body member which it is adapted to restrain and being permanently elongatable when subjected to tension forces in excess of its yield strength; and means for locking said first and second frame sections in a selected angular relationship whereby a person reclining on the couch will be supported in a manner to avoid injury when subjected to excessive "G" forces applied through the webbing and restraint means.

3. A shock-absorbing body support means adapted to be used as a couch comprising:

a frame of rigid spaced members encompassing an occupant-receiving space, said frame comprising first and second sections which are pivotally connected to one another;

a fabric webbing support comprised of a plurality of sections of normally non-elastic material each of which possesses a yield strength in predetermined relationship to the mass of the body member of a person it is adapted to support when the person is reclined on said couch and which is permanently elongatable beyond its normal length when subjected to tension forces in excess of the yield strength of the material;

means for securing the peripheral margins of the webbing to the frame whereby each of said sections of webbing is attached to spaced members of said frame and the webbing and said first frame section are adapted to support the torso and head of a person reclining on said support means and the webbing and second frame section are adapted to support the legs of the person; and means for locking said frame sections in a selected angular relationship whereby a person reclining on the couch will be supported in a manner to avoid injury when excessive "G" forces are applied through the webbing upon said person.

4. A body support means for supporting a body when subjected to large "G" forces, said body support means comprising:

a frame having rigid side members;

a webbing of partially drawn synthetic plastic cords which have the property of becoming permanently elongated whenever subjected to loads in excess of their yield strength;

means for securing the peripheral margins of the webbing to the frame whereby the webbing is disposed between said rigid side members and secured in a taut spread condition, said webbing being comprised of a plurality of sections, each of which is attached to the side members of said frame and provided with a yield strength of predetermined magnitude in correspondence with the mass of a member of the body it is adapted to support; and restraint means secured to said webbing for restraining a body from movement relative thereto, said restraint means having a yield strength in predetermined relationship to the mass of the body member which it is adapted to restrain and adapted to permently elongate when subjected to forces in excess of its yield strength whereby omnidirectional "G" forces applied through the webbing and restraint means upon the body will be absorbed by the body support means and the attitude and posture of the body will be maintained during the application of said forces.

5. A body support means adapted to provide support for a body when subjected to large "G" forces, said body support means comprising:

a frame of rigid spaced members;

a webbing comprised of a plurality of sections of partially drawn synthetic cords, each of said section being attached to spaced members of said frame and possessing a yield strength of predetermined magnitude in correspondence with the mass of a part of the body it is adapted to support; and restraint means secured to the webbing for restraining a body from movement relative thereto, said restraint means being fabricated of partially drawn synthetic cords which have a predetermined yield strength and are permanently elongatable beyond their normal length when subjected to tension forces in excess of their yield strength whereby omnidirectional "G" forces applied upon the body through the webbing and restraint means and which exceed the yield strength of any of said sections or restraint means will be attenuated during elongation of said cords and the attitude and contour of the body maintained during the application of said forces.

6. A body support means adapted to provide support for a body when subjected to large "G" forces, said body support means comprising:

a rigid frame of spaced members;

a webbing;

means for securing the peripheral margins of the webbing to the frame whereby the webbing is disposed between the members of the frame and secured thereto in a taut spread condition, said webbing being comprised of a plurality of sections each having the property of becoming permanently elongated when subjected to tension forces in excess of its yield strength and having a yield strength of a magnitude corresponding to the mass of a particular part of the body it is adapted to support whereby large "G" forces exceeding the yield strengths of said sections and applied through the webbing upon the body will be absorbed and attenuated by the body support means and the attitude and posterior contour of the body maintained during the application of said forces.

7. A shock-absorbing body support means adapted to be used as a couch, said body support means comprising:

a rigid frame;

a webbing, said webbing being comprised of a plurality of sections each having the property of becoming permanently elongated when subjected to tension forces in excess of its yield strength and having a yield strength of a magnitude corresponding to the mass of a particular part of the body it is adapted to support; and means for attaching the webbing within the frame in a taut spread condition, said frame and webbing having a curvature in profile which substantially corresponds to the contour of the posterior of a person's body whereby the body support means when used as a couch will provide continuous support throughout the length of the body of a person reclining on the webbing and the application of large "G" forces through the webbing upon the body will be absorbed and attenuated by the body support means and the attitude and posterior contour of the body maintained during the application of said forces.

8. A shock-absorbing body support means adapted to be used as a couch, said body support means comprising:

a rigid frame;

a webbing, said webbing being comprised of a plurality of sections each having the property of becoming permanently elongated when subjected to tension forces in excess of its yield strength and having a yield strength of a magnitude corresponding to the mass of a particular part of the body it is adapted to support; and means for attaching the webbing to the frame in a taut spread condition whereby the body support means when used as a couch is adapted to attenuate and absorb large "G" forces applied against the body of a person reclining on the webbing.

References Cited by the Examiner

UNITED STATES PATENTS

| | | | |
|---|---|---|---|
| 2,881 | 12/42 | Curtiss | 5—191 |
| 641,278 | 1/00 | Dick | 5—190 |
| 1,567,493 | 12/25 | Douglas | 5—187 |
| 2,127,710 | 8/38 | Baker | 5—186 |
| 2,355,635 | 8/44 | Dubilier | 5—186 |
| 2,475,588 | 7/49 | Bierman | 297—385 |
| 2,637,368 | 5/53 | Cotton | 297—216 |
| 2,829,702 | 4/58 | Keating | 297—457 |
| 2,858,551 | 11/58 | Sidlinger | 5—187 |
| 2,963,712 | 12/60 | Cole | 5—186 |
| 3,011,826 | 12/61 | Bowring et al. | 297—460 |

FRANK B. SHERRY, *Primary Examiner.*